W. E. COFFIN.
TIMBER POCKET.
APPLICATION FILED DEC. 28, 1909.
1,054,175.
Patented Feb. 25, 1913.
3 SHEETS—SHEET 1.
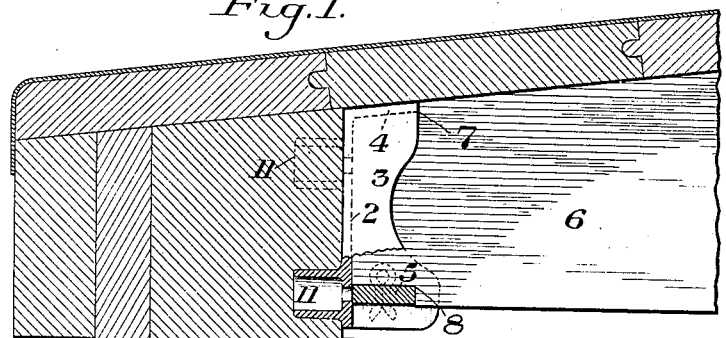
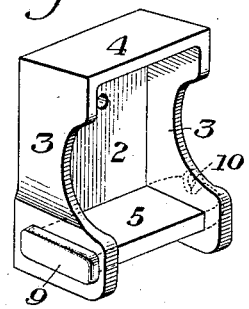
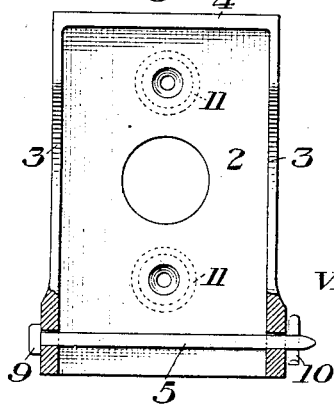 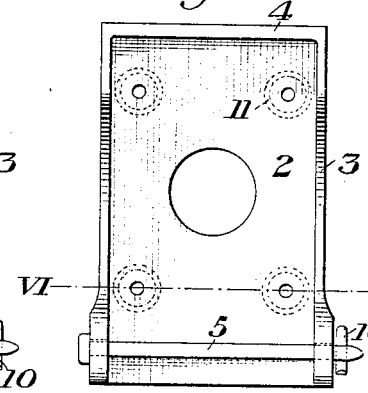 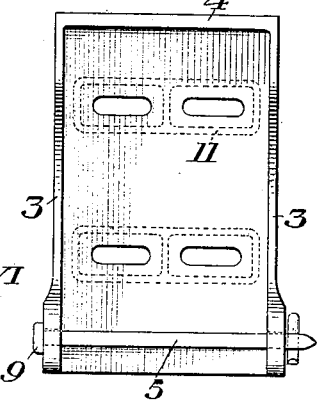
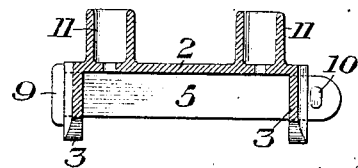
WITNESSES
R. A. Balderson
J. B. Blessing
INVENTOR
W. E. Coffin,
by Bakewell, Byrnes & Parmelee
his Attys W. E. COFFIN.
TIMBER POCKET.
APPLICATION FILED DEC. 28, 1909.
1,054,175.
Patented Feb. 25, 1913.
3 SHEETS—SHEET 2.
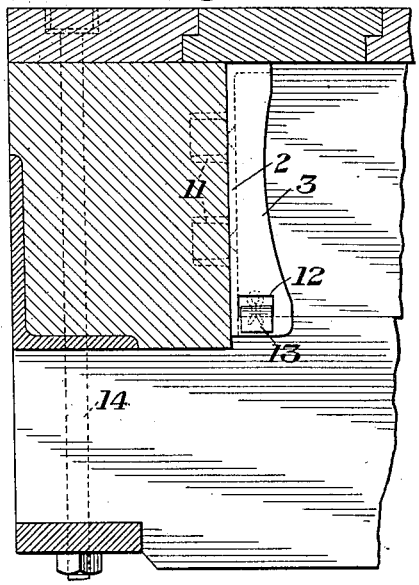
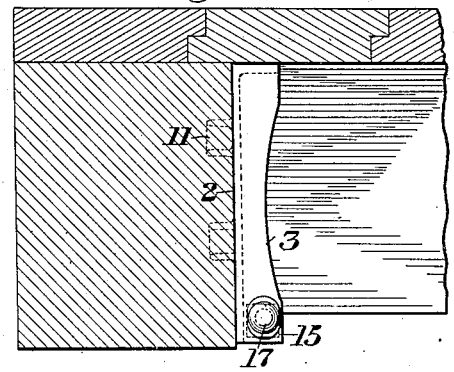
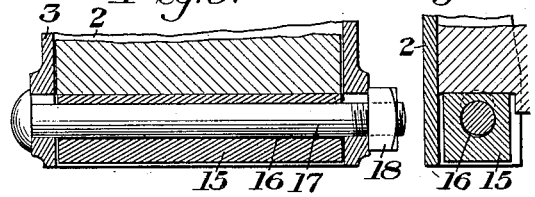
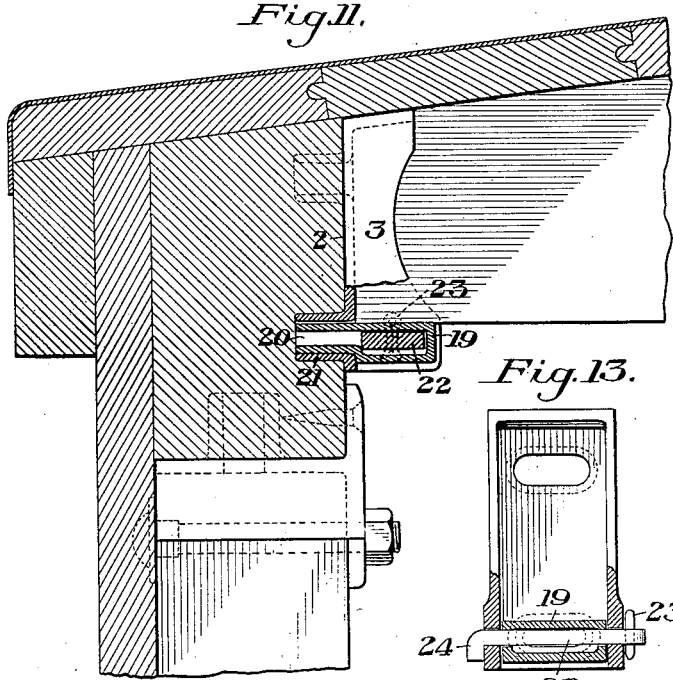
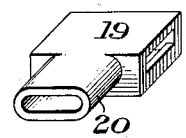
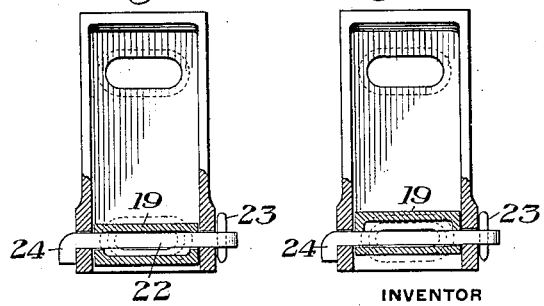
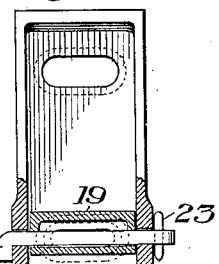
WITNESSES
R. A. Balderson
J. B. Bleming
INVENTOR
W. E. Coffin,
by Bakewell, Byrnes & Parmelee.
his Attys

W. E. COFFIN.
TIMBER POCKET.
APPLICATION FILED DEC. 28, 1909.

1,054,175.

Patented Feb. 25, 1913.
3 SHEETS—SHEET 3.

WITNESSES
R. A. Balderson
G. B. Bleming

INVENTOR
W. E. Coffin,
by Bakewell, Byrnes & Parmelee
his Attys

UNITED STATES PATENT OFFICE.

WALTER E. COFFIN, OF CLEVELAND, OHIO, ASSIGNOR TO THE NATIONAL MALLEABLE CASTINGS COMPANY, OF CLEVELAND, OHIO, A CORPORATION OF OHIO.

TIMBER-POCKET.

1,054,175. Specification of Letters Patent. Patented Feb. 25, 1913.

Application filed December 28, 1909. Serial No. 535,267.

*To all whom it may concern:*

Be it known that I, WALTER E. COFFIN, of Cleveland, Cuyahoga county, Ohio, have invented a new and useful Timber-Pocket, of which the following is a full, clear, and exact description, reference being had to the accompanying drawings, forming part of this specification, in which—

Figure 15:
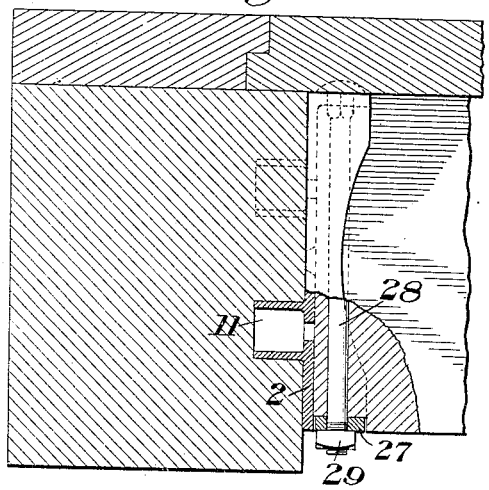
Figure 16:
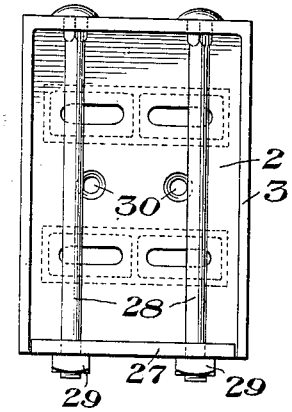
Figure 17:
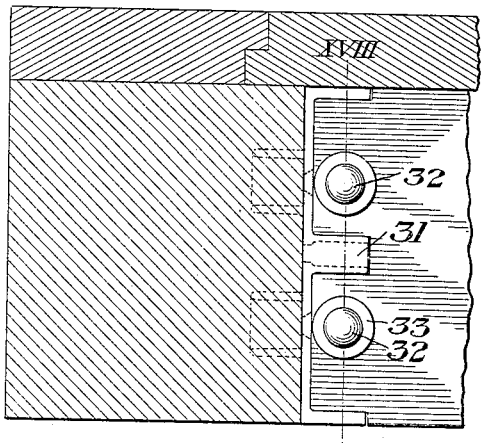
Figure 18:
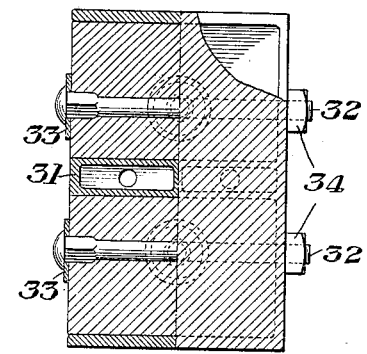
Figure 19:
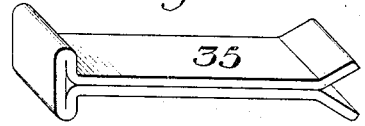

Figure 1 is a sectional view showing one form of my invention as applied to a roof carline; Fig. 2 is a perspective view of the timber pocket removed; Figs. 3, 4 and 5 are front elevations showing different forms of the pocket; Fig. 6 is a section on the line VI—VI of Fig. 4; Figs. 7 and 8 are sectional views showing other forms of my invention applied to car sills where they abut against the end sills of the car framing; Figs. 9 and 10 are detail views showing the adjustable key of Fig. 8; Fig. 11 is a view similar to Fig. 1 showing still another form of the invention; Fig. 12 is a perspective view of a modified form of the key; Figs. 13 and 14 are front elevations partly in section showing the key of Figs. 11 and 12, the key being shown in different positions in the pocket; and Fig. 15 is a view similar to Fig. 8 showing another form of pocket; Fig. 16 is a front elevation of the pocket shown in Fig. 15; Fig. 17 is a view similar to Fig. 15 but showing still another form of pocket; Fig. 18 is a section on the line XVIII—XVIII of Fig. 17; and Fig. 19 is a perspective view showing another form of key.

My invention has relation to metal pockets for use in fastening the timbers of railway cars together, and commonly known as timber pockets.

An object of my invention is to provide a device of this character, in which the open side of the pocket may be closed by a bolt or key member which can be inserted or removed from the side without in any way interfering with the timber bolts used for securing the timbers together.

A further object of my invention which is inherent in the preferred forms thereof, is to provide a timber pocket having means whereby shrinkage in the timbers can be readily taken up.

Other objects and advantages of my invention will hereinafter appear.

Referring first to that form of my invention which is shown in Fig. 1, the timber pocket consists of a casting comprising a flat base plate 2, projecting side walls 3 and top portion 4, the bottom portion of the pocket between the side flanges 3 being open. 5 designates a key which is adapted to be inserted in apertures in the lower portions of the side flanges 3 in the manner shown for the purpose of closing the open side of the pocket after the timber 6 has been inserted therein. This timber is shouldered or tenoned at 7 to enter the pocket, and is also preferably cut away at 8 to receive the key 5. The key is shown as formed with a head 9 at one end, and is secured by means of a pin or cotter 10. This key can be readily inserted and removed from the side after the timber has been put in place and without in any way disturbing the usual timber bolts. The base plate may be provided with one or more bosses or projections 11, which enter holes cut therefor in the timber 11$^a$. If desired, the usual lugs or bosses can be omitted and simple screw holes provided.

The modification shown in Figs. 3, 4 and 5 illustrate different arrangements of these bosses. Fig. 3 shows a pocket having two circular bosses; Fig. 4 shows a pocket having four circular bosses; Fig. 5 shows one having bosses or projections of angular form.

The timber pocket shown in Fig. 7 is similar to that first described, except that the apertures 12 in the side flanges for the key 13 are elongated vertically. By drawing up on the timber bolts 14, the key can move vertically in the slot 12 a short distance to compensate for shrinkage in the timbers.

In Fig. 8 I have shown a key which consists of a member 15 of angular form in cross-section, and which is formed with a bolt-hole 16 which is located eccentrically of both the vertical and transverse center lines of the member. This key is inserted into the pocket from the bottom, and a bolt 17 which may be secured by an ordinary nut 18 is passed through the key as shown. The member 15 can be turned to seat on any one of its four sides, and owing to the eccentric location of the bolt hole, gives a different position for the bolt in each of its different positions, thus providing for taking up shrinkage of the timbers. It will be obvious that instead of being arranged to give four different adjustments, a key may be employed which will give two, three, or more than four adjustments.

In the construction shown in Fig. 11 a key member 19 is employed of the form shown in detail in Fig. 12, and which has a dowel portion or projection 20 adapted for insertion in one of the hollow bosses or projections 21 on the base portion of the pocket. By reason of the provision of this dowel portion, downward strains upon the carline or other timber, as the case may be, are not assumed entirely by the key, but are taken partially by the bearing of the dowel portion in the boss or socket. A flat bolt or pin 22 is passed through the key as shown in Fig. 11, and is secured against displacement by a pin or cotter 23. The dowel projection 20 is eccentric with respect to the horizontal axis of the key member, so that the key may be reversed to give different adjustments.

In Figs. 13 and 14 I also show a key member like that shown in Figs. 11 and 12. The pin 22 is bent at one end to form a head 24 and is secured at the other end by a cotter 23. These two figures also illustrate the reversible character of the key shown in Fig. 12.

In the form shown in Figs. 15 and 16 the open side of the pocket is closed by a removable piece or plate 27, which is secured in place by vertical bolts 28 having nuts 29 at their lower ends. With this form, shrinkage is taken up by simply tightening the nuts. This form of pocket is also shown as provided with screw holes 30 in its base.

The form shown in Figs. 17 and 18 is one which can be used to advantage where it is desired to remove the timber sidewise instead of by lowering it. Such a case would occur in the removal of side sills in car construction. In this case the end of the timber is cut away sufficiently to engage the top and bottom walls of the pocket, and also the central dowel or projection 31, the pocket being open at the side. After the timber has been inserted by sliding it from the side, the transverse bolts 32 are put in position, with washers 33, which give a broad bearing upon the timber, the bolts being drawn up tightly by means of the nuts 34.

Fig. 19 shows a split key 35, which can be used in place of the keys shown in the other figures. With this form of key, after it has been put in place the ends can be bent outwardly, thus securing the key in place without the use of an additional cotter.

The advantages of my invention will be apparent from the foregoing description, since it provides a timber pocket which can be readily applied, which greatly facilitates the connection with the parts, and which, in the preferred forms, also provides simple and ready means for taking up timber shrinkages.

It will be obvious that my invention is not limited to the use of the particular forms of keys for securing means, which I have herein shown and described, since devices of various other forms may be employed.

I claim:—

1. A timber pocket having its top and sides closed, its bottom side being comprised of a separate member, the sides of the pocket being apertured for reception of the separate member and said separable member being removable in a direction transverse to the longitudinal axis of the timber supported in the pocket: substantially as described.

2. A timber pocket having its top and sides closed and its bottom being open, and a separate member for normally closing the bottom side, said separable member being removable in a direction transverse to the longitudinal axis of the timber supported in the pocket, together with means for varying the distance between the inner side of said member and the opposite side of the pocket to compensate for shrinkage in the timber; substantially as described.

3. A timber pocket comprising an integral casting having a base portion and flanges at three sides thereof, the fourth side being open, and a member arranged to close the open side after the timber has been inserted, said member being reversible to vary the distance between its inner side and the opposite wall of the pocket, and means for securing the member in its different positions; substantially as described.

4. A timber pocket having a base portion and projecting flanges at its top and at each side, its bottom being comprised of a removable securing key extending transversely through the lower portions of the side flanges and being seated therein, said key being seated and unseated by an endwise movement thereof substantially at right angles to the sides of the pocket; substantially as described.

5. A timber pocket comprising a casting having a base portion, and flanges at three sides, and being open at the fourth side, and a key device adapted to be removably seated across the open side, said device being reversible and having an eccentric opening therethrough, and a pin or bolt engaging said eccentric opening; substantially as described.

6. A timber pocket having an open side, and a removable key member adapted to close the open side, the base portion having a hollow boss or projection, and a key member having a dowel portion adapted to enter the boss or projection; substantially as described.

7. A timber pocket having an open side and a removable key member adapted to close the open side, the base portion having a boss or projection, formed with an opening therein, and a key member having a dowel portion adapted to enter the boss or projection, said key member being reversible to give different adjustments.

8. A timber pocket of rectangular form and adapted to receive and confine the four sides of the end of a timber, the bottom wall of said pocket being movable toward and away from the opposite wall to compensate for shrinkage or other variations of the timber, and means connected with the side wall for securing the bottom wall in different positions; substantially as described.

9. A timber pocket comprising a casting having a base portion, and flanges at three sides, and being open at the fourth side, and means removably seated across said open side for diminishing the vertical dimensions of said pocket.

10. A timber pocket, composed of a casting having a base portion, and flanges at three sides, and the fourth side consisting of a removable member adapted to be secured in adjacent sides and being adjustable with respect to the opposite side to compensate for shrinkage or variation in size of the timber.

In testimony whereof, I have hereunto set my hand.

WALTER E. COFFIN.

Witnesses:
CHESTER K. BROOKS,
HARRY E. ORR.